United States Patent [19]

McIver

[11] 3,793,609

[45] Feb. 19, 1974

[54] LOW INSERTION FORCE PRINTED BOARD CONNECTOR

[75] Inventor: William McIver, Anaheim, Calif.

[73] Assignee: Microdot Inc., South Pasadena, Calif.

[22] Filed: Dec. 13, 1971

[21] Appl. No.: 207,413

[52] U.S. Cl. .......................... 339/74 R, 339/176 MP
[51] Int. Cl. .......................... H01r 13/62
[58] Field of Search .................. 339/17, 74, 75, 176

[56] References Cited

UNITED STATES PATENTS

| | | | |
|---|---|---|---|
| 3,611,259 | 10/1971 | Palecek | 339/74 R |
| 3,537,063 | 10/1970 | Beaulieu | 339/74 R |
| 3,426,313 | 2/1969 | Wycheck | 339/74 R |
| 3,518,612 | 6/1970 | Dunman et al. | 339/74 R |
| 3,638,167 | 1/1972 | Occhipinti et al. | 339/74 R |

*Primary Examiner*—Joseph H. McGlynn
*Attorney, Agent, or Firm*—Smyth, Roston & Pavitt

[57] ABSTRACT

Normally electrical contacts of a socket assembly are resiliently biased against complementary electrical terminals on a printed circuit board, which board seats in a slot of the socket assembly. An elongated actuator is insertable longitudinally of the socket assembly to temporarily retract the contacts by cam action to clear the slot for entrance of a printed circuit board. A gate at the entrance to the slot normally bars entry of a printed circuit board. The gate may be opened by the completely inserted actuator but only if the contacts are retracted.

27 Claims, 17 Drawing Figures

PATENTED FEB 19 1974

3,793,609

LOW INSERTION FORCE PRINTED BOARD CONNECTOR

BACKGROUND OF THE INVENTION

Typically, a zero force connector for a printed circuit board comprises a socket assembly with a slot therein to receive an edge portion of the printed circuit board and with contacts in the slot biased resiliently to cooperate with complementary electrical terminals on the printed circuit board. It is highly desirable to retract the contacts out of the way temporarily to avoid interference with insertion of a printed circuit board and to avoid damage to the contacts as well as to avoid frictional wear on the printed circuit board. For this purpose some socket assemblies permanently incorporate cam shafts to retract the contacts. Such arrangements are disclosed, for example, in Herrmann U.S. Pat. No. 3,114,587, Anhalt et al. U.S. Pat. No. 3,495,132, Parker et al. U.S. Pat. No. 3,489,990 and Dunman et al. U.S. Pat. No. 3,518,612.

One disadvantage of these prior art socket assemblies is that in a socket assembly having a plurality of slots to receive a plurality of printed circuit boards, it is necessary to incorporate a separate cam shaft for each of the plurality of slots. A more serious disadvantage is that an operator may inadvertently remove a printed circuit board or attempt to insert a printed circuit board without manipulating the corresponding cam shaft to retract the corresponding contacts.

SUMMARY OF THE INVENTION

One object of the invention is to eliminate the necessity for multiple cam shafts in a multiple-slot socket assembly. Elimination of the need for multiple cam shafts is accomplished by constructing the socket assembly with a plurality of longitudinal passages corresponding to the plurality of slots and by providing a single elongated contact actuator which may be inserted into the plurality of passages selectively to retract the contacts from the slots.

Another object of the invention is to preclude the possibility of inserting the edge portion of a printed circuit board into a slot of the socket assembly while the corresponding contacts extend into the slot. This object of the invention is accomplished by two provisions. One provision,is to arrange for an edge portion of a printed circuit board to enter a slot of the socket assembly only at one end of the slot, the edge portion of the printed circuit board sliding along the slot longitudinally of the slot to the final position of the printed circuit board. The second provision is a gate at the entrance of each slot, which gate is normally closed to bar entrance of a printed circuit board. The gate may be opened temporarily by manual rotation of the completely inserted contact actuator but only if the contacts along the slot are retracted.

In one embodiment of the invention, the leading end of the elongated actuator is tapered to form a cam surface that retracts the contacts in succession as the actuator is inserted into the socket assembly. Complete insertion of the actuator operatively connects the actuator to the corresponding gate to permit the gate to be opened by manual rotation of the inserted actuator.

In a second embodiment, the actuator is first inserted into the contact assembly and is then rotated to retract the contacts. Here again complete insertion of the actuator into the socket assembly operatively connects the actuator to the corresponding gate to permit the gate to be opened by manual rotation of the inserted actuator.

One feature of the invention is a modular construction for a multiple-slot socket assembly that not only lowers the cost of manufacture but also makes it possible to fabricate different socket assemblies out of stock modules. Another feature is the concept of using two multiple-slot socket assemblies in tandem with the contacts of both socket assemblies operable by a single relatively long actuator.

A further feature of one practice of the invention is a multiple-slot socket assembly in which each slot is guarded by two gates at its opposite ends respectively. A contact actuator may be inserted from either end of the assembly and the inserted actuator is operatively connected to whichever of the two gates is at the end of the assembly into which the actuator is inserted.

The various features and advantages of the invention may be understood from the following detailed description and the accompanying drawings.

Figures 4, 4A, 8:
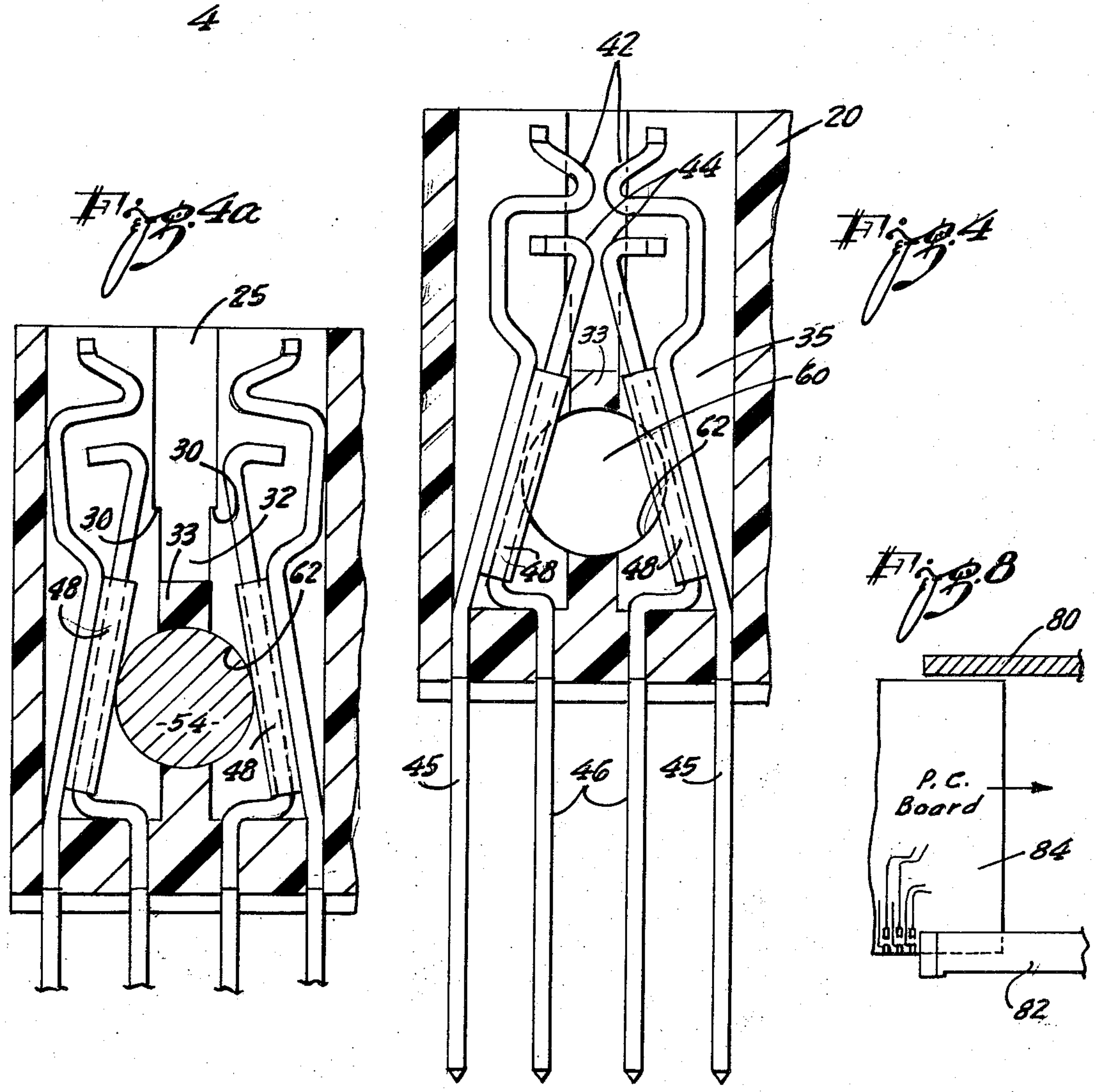
FIG. 4 is an enlarged transverse section taken as indicated by the line 4 — 4 of FIG. 1 and showing how two rows of contacts along a slot are biased to cooperate with corresponding terminals on the edge portion of a printed circuit board, the printed circuit board being omitted.
Figures 2, 3, 7:
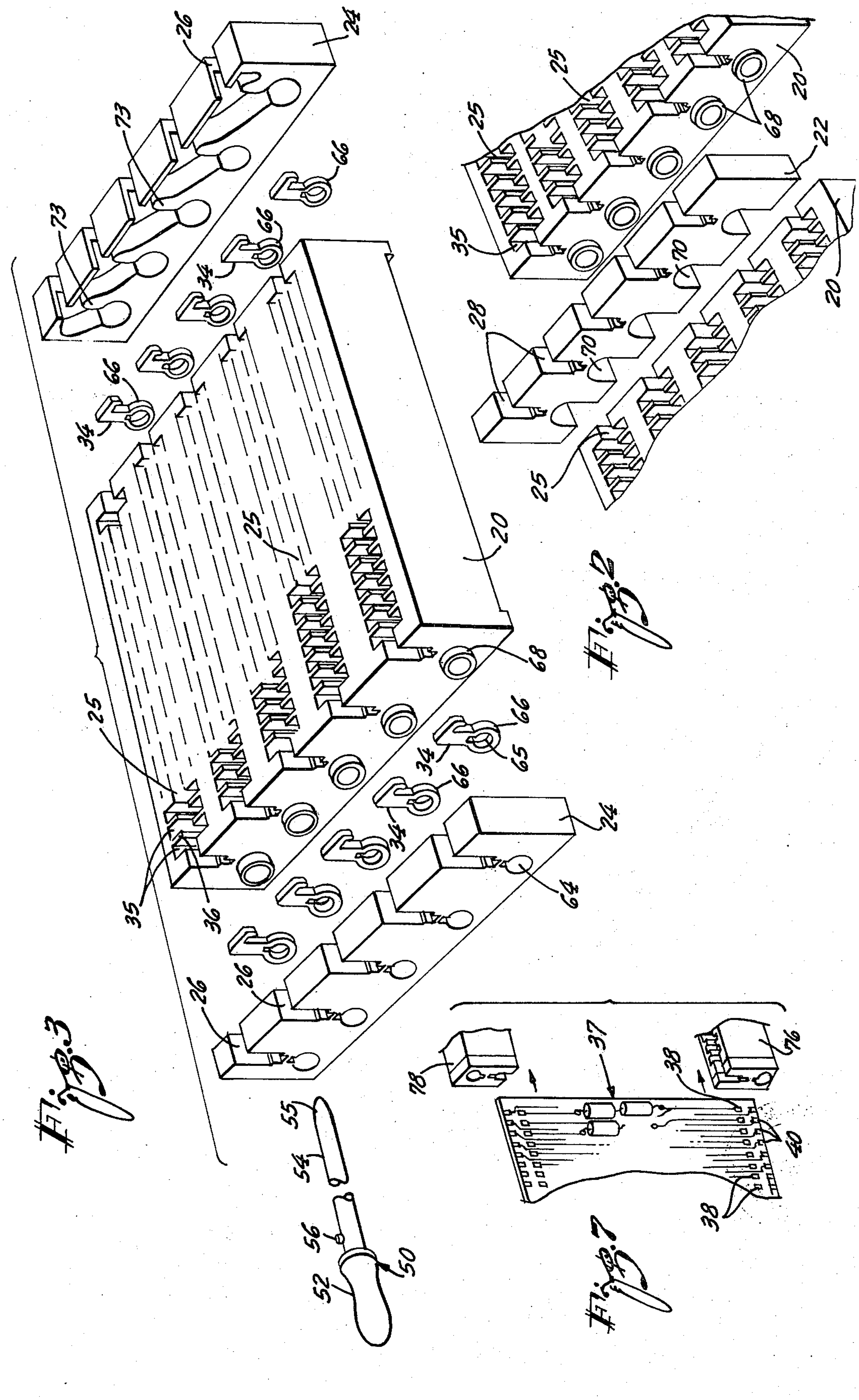
FIG. 2 is a fragmentary exploded perspective view showing the structure at the juncture of the two socket bodies in FIG. 1.
FIG. 3 is a perspective exploded view of a socket assembly showing the modular construction of the assembly.
Figures 5, 6:
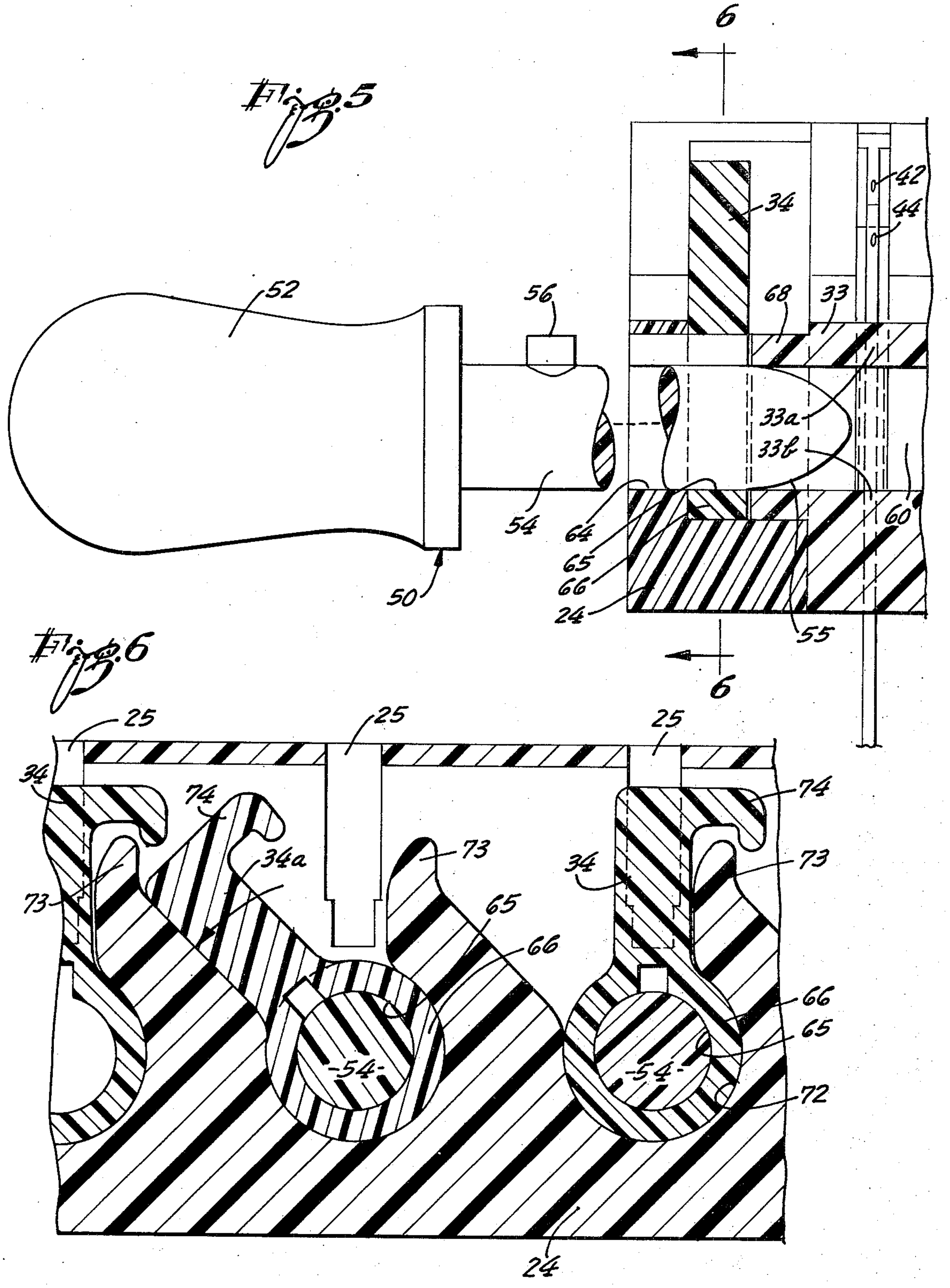
Figures 9, 10, 11, 12, 13, 14, 15, 16:
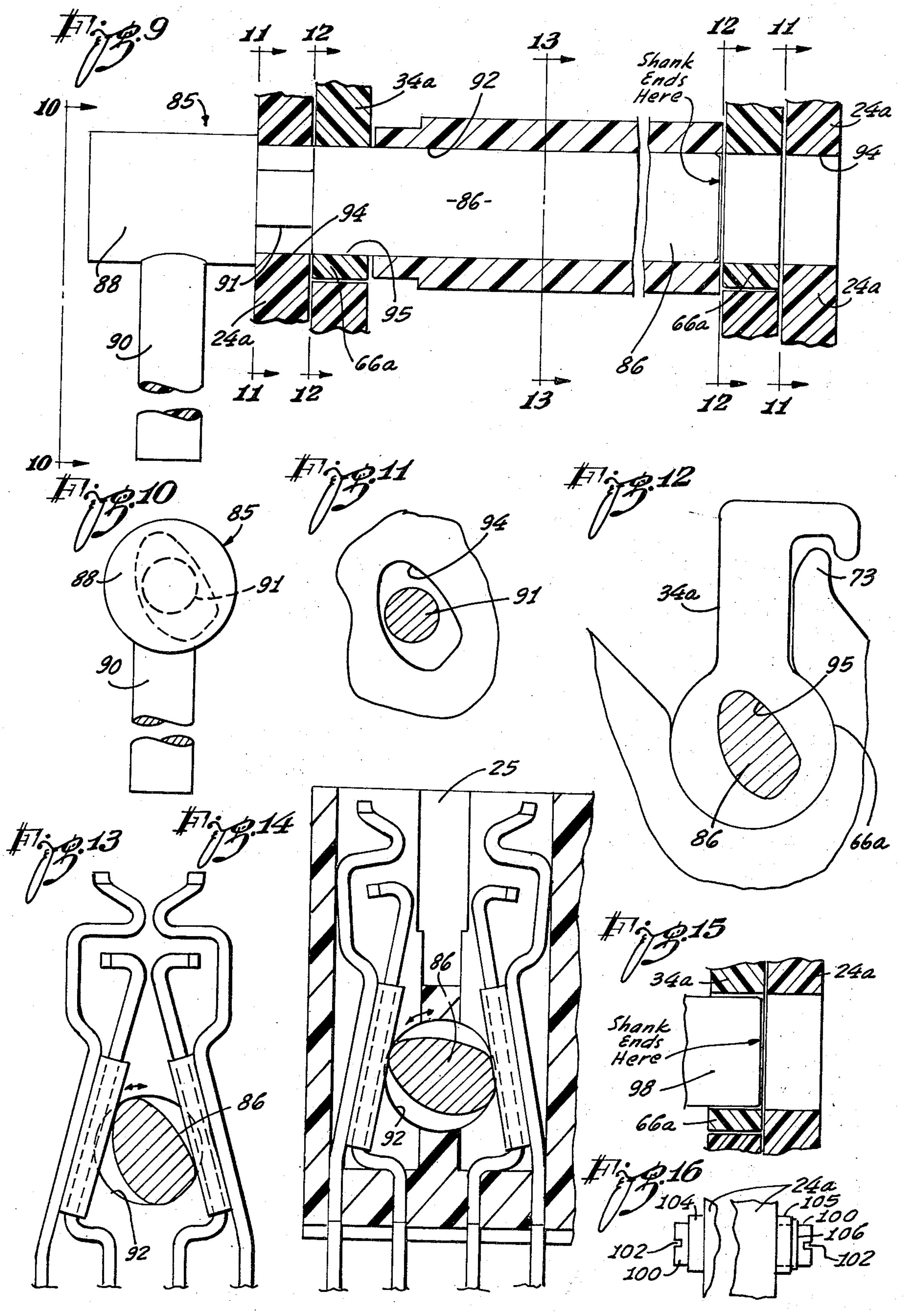

FIG. **4*a*** is a similar view with the contact actuator inserted to retract the two tows of contacts to permit the edge portion of a printed circuit board to be inserted freely into the slot longitudinally of the slot;

FIG. 5 is a greatly enlarged fragmentary sectional view showing how a contact actuator is inserted into a longitudinal passage of a socket connector to retract the contacts associated with one of the longitudinal slots of the assembly and to open the corresponding gate;

FIG. 6 is transverse section taken as indicated by the line 6—6 of FIG. 5 showing one gate in closed position and showing another gate in open position;

FIG. 7 is a fragmentary perspective view showing how parallel upper and lower socket assemblies may cooperate with the opposite longitudinal side edges respectively of a printed circuit board;

FIG. 8 is a fragmentary side elevation partly in section showing how a guard may be positioned above a socket assembly to make sure that the edge portion of a printed circuit board enters a slot of the socket assembly only longitudinally of the slot;

FIG. 9 is a view partly in section and partly in elevation of a second embodiment of the invention showing a contact actuator fully inserted into the socket assembly;

FIG. 10 is an end view of the contact actuator as seen along the line 10 — 10 of FIG. 9;

FIG. 11 is a transverse section taken along the lines 11 — 11 of FIG. 9;

FIG. 12 is a transverse section taken along the lines 12 — 12 of FIG. 9 showing how the fully inserted contact acutator is operatively connected to a gate that normally blocks entrance into the corresponding slot of the socket assembly;

FIG. 13 is a transverse section taken along line 13 — 13 of FIG. 9 showing the inserted contact actuator is positioned for rotation about its longitudinal axis to cam the biased contacts to their retracted positions;

FIG. 14 is a similar view showing the contacts retracted by the inserted actuator;

FIG. 15 is a fragmentary sectional view illustrating a modification of the structure shown in FIG. 9; and FIG. 16 is a broken side elevational view illustrating another embodiment of the invention.

DESCRIPTION OF THE SELECTED EMBODIMENTS OF THE INVENTION

Figure 1:
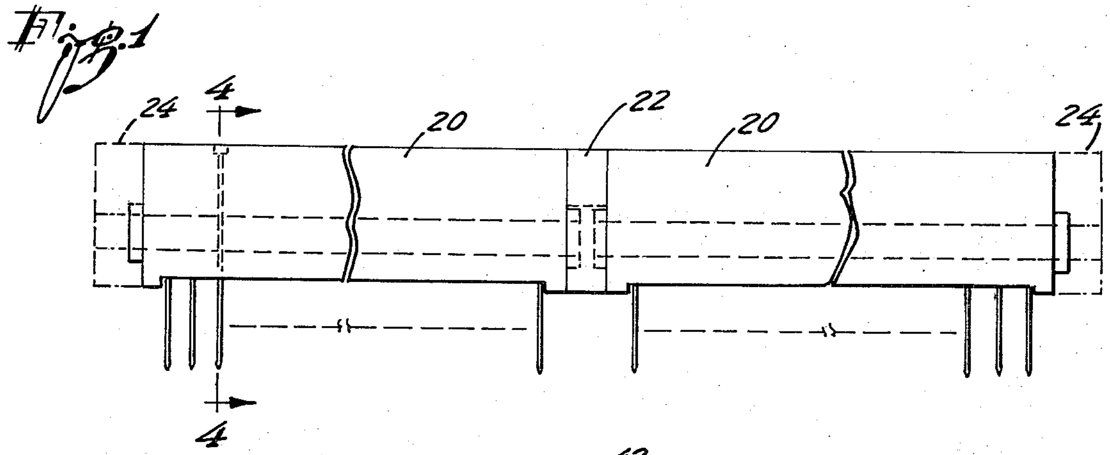
FIG. 1 is a side elevation of one embodiment of the invention in which two socket bodies are positioned end to end, the contacts of both bodies being operable by insertion of a single actuator.

FIG. 1 shows a socket assembly made of suitable plastic material in which two socket bodies 20 are positioned end to end with their rear ends confronting each other and interlocked by an intervening center mounting block 22. The outer end of each socket body 20 interlocks with a corresponding end mounting block 24. FIG. 2 is a perspective exploded view showing the center mounting block 22 and the adjacent rear ends of the two socket bodies. Either one of the two socket bodies 20 and the center mounting block 22 of FIG. 1 may be omitted to leave a socket assembly which comprises a single socket body 20 together with a forward and rearward end mounting blocks 24. FIG. 3 shows such a socket assembly which is operable from either of its two opposite ends, the socket assembly comprising a single socket body 20 with two end mounting blocks 24 at its opposite ends respectively.

Each of the socket assemblies provides for end entry of five corresponding printed circuit boards. Thus each of the socket bodies 20 has five longitudinal slots 25 on its upper side; each end mounting block 24 has five slots 26 on its upper side which serve as continuations of the body slots 25; and where a center mounting block 22 is employed, the center mounting block has five short slots 28 on its upper side which also serve as continuations of the body slots 25. Each of the slots 25, 26, or 28 is of a width to accommodate a printed circuit board, and as best shown in FIG. 4*a* each of the slots 25, 26, and 28 is formed with a pair of opposite longitudinal internal shoulders 30 to provide clearance to prevent printed circuit board from excessive wiping when installed. A narrow portion 32 of each slot extends below the two longitudinal shoulders to provide guidance for the printed circuit board. The lower edge of each slot 25 is the upper edge of a low vertical longitudinal wall 33 of the socket body 20.

Each end block 24 incorporates a gate 34 for each slot which normally bars entrance of a printed circuit board into the end of the slot. FIG. 6 shows two of the gates 34 in positions closing the ends of the corresponding slots 25 and further shows a third gate 34*a* swung to open position to clear the entrance of the corresponding slot.

Spaced apart longitudinally of each slot 25 in a socket body 20 is a series of transverse compartments 35 separated by partitions 36 which compartments extend laterally from both sides of the slot and house suitable retractable contacts to cooperate with corresponding electrical terminals on a printed circuit board.

A printed circuit board to cooperate with the socket assembly may be of the character shown in FIG. 7. In FIG. 7 the lower edge portion of a printed circuit board 37 has on each of its opposite faces at each of its two longitudinal side edge portion an outer row of electrical terminals 38 and an inner row of corresponding terminals 40 one of which rows of terminals may serve as ground terminals.

As shown in FIGS. 4 and 4*a* each of the transverse compartments 35 may house two pairs of electrical contacts 42 and 44, the two upper contacts 42 being positioned to cooperate with inner terminals 38 on the opposite sides of an edge portion of a printed circuit board and the lower contacts 44 being positioned to cooperate with the outer electrical terminals 40 on opposite sides of the edge portion of the printed circuit board. The upper contacts 42 are curved portions of resilient conductors 45 and in like manner the lower contacts 44 are curved portions of a pair of resilient conductors 46, the lower ends of the four conductors extending from the bottom of the socket body 20 for connection to corresponding circuit components. If desired the exposed lower end portions of the four conductors may serve as prongs for plugging the socket assembly into a complementary electrical assembly. As heretofore indicated one of the two pairs of contacts 42, 44 may serve as ground contacts. In the construction shown, portions of the conductors 45 and 46 lie close together and the portions of the conductors 46 are equipped with plastic insulating sleeves 38.

As heretofore stated, a feature of the invention is the concept that the rows of pairs of contacts 42 and 44 may be operated selectively by an elongated actuating member which is normally outside of the socket assembly but is inserted whenever it is desired to insert or withdraw a printed circuit board.

In this embodiment of the invention a contact actuator made of suitable plastic material is employed which is generally designated 50 in FIGS. 3 and 5. The contact actuator comprises a handle 52 mounted on the end of a shank 54 that has a tapered leading end 55 to serve as a conical wedge for camming the contacts 42 and 44 from their effective positions shown in FIG. 4 to their retracted positions shown in FIG. 4*a*. The shank 54 has a short radial key projection 56 which is spaced a short distance from the handle 52.

To cooperate with the contact actuator 50, a socket assembly has a plurality of longitudinal passages 60 into which the contact actuator 50 may be inserted selectively, the plurality of passages corresponding to the plurality of longitudinal slots 75 in the socket assembly with each passage immediately below the corresponding slot. As may be seen in FIGS. 4 and 4*a* each passage 60 lies between the pairs of insulating sleeves 48 of of the pairs of conductors 46. The passage 60 is formed in part by circular openings 62 in the series of compartment partitions 36. The passage 60 is cut through the previously mentioned low longitudinal wall 33 longitudinally of the wall and since the passage is substantially wider than the wall the passage divides the wall into upper and lower portions 33*a* and 33*b*.

Referring to FIG. 3, the entrance to each of the passages 60 is a keyhole aperture 64 in an end mounting block 24, the keyhole configuration providing radial clearance for the radial key projection 56 of the contact actuator 50. Adjacent the keyhole aperture 64 each passage is continued by a similar keyhole aperture 65 in a cylindrical base portion 66 of a corresponding gate 34. As shown in FIG. 5 each passage 60 is continued beyond the gate 34 by a corresponding tubular projection 68 on the socket body 20 which mates with the end mounting block 24 to interlock the socket body with the end block. Beyond the tubular projection 68 each passage is continued by the upper and lower portions 33*a* and 33*b* of the low longitudinal wall 33, together with the series of circular openings 62 in the compartment partitions 36.

At the second end of a socket body 20, the passages 60 are continued by a second set of tubular projections 68 which mate with a mounting block. In FIG. 2 where two socket bodies 20 are positioned in tandem the second set of tubular projections 68 of the socket body mate with a center mounting block 22. As shown in FIG. 2 the center mounting block 22 is formed with recesses 70 that receive the tubular projections 68 and serve as continuations of the passages 60. The recesses 70 are in the form of notches that are open to the lower edge of the center mounting block.

In FIG. 3 the tubular projections 68 on the second end of the socket body 20 (not shown) mate with a second end mounting block 24. Each passage 60 of the socket body is continued by a keyhole aperture 65 in a second gate 34 and, finally, each passage is continued by a previously mentioned keyhole aperture 64 in the second end block 24.

Referring to FIGS. 5 and 6, the cylindrical base portion 66 of each of the gates 34 is journaled and retained in a corresponding arcuate recess 72 in the corresponding end block 24, the recess being shaped as shown to give the gate freedom to swing between the open and closed positions. Preferably suitable detent means is provided to yieldingly retain each of the gates 34 in its normal closed position. For this purpose, as shown in FIG. 6, the outer end of each gate 34 is provided with a lateral detent extension 74 which is suitably flexible and which is shaped and dimensioned to hook over a corresponding fixed detent element 73 formed by the material of the end block 24.

The manner in which the contact actuator 50 serves its purpose may be readily understood from the foregoing description. When the contact actuator 50 is outside of the socket assembly shown in FIG. 3, all of the pairs of upper contacts 42 and lower contacts 44 of the socket assembly are in their normal effective positions, the contacts being biased into the interiors of the various longitudinal slots 25. When the contact actuator 50 is inserted into either of the two ends of a passage 60 of the socket assembly with the radial key projection 56 of the contact actuator directed upwardly, the pointed leading end of the actuator serves as a wedge to retract the contacts 42 and 44 in the compartments 35 successively and when the contact actuator is fully inserted all of the pairs of contacts associated with the corresponding slot 25 are retracted. It can be seen in FIGS. 4 and 4*a* that the wedging or cam action is against the plastic sleeves 48 of the conductors 46 to spread the pairs of conductors 46 and thereby spread the pairs of conductors 45 that lie against the conductors 46.

With the radial key projection 56 oriented to its upward vertical position shown in FIGS. 3 and 5, the key projection readily passes through the keyhole aperture 64 in the end mounting block 24 and readily advances into the keyhole aperture 65 of the corresponding gate 34. At this point with the radial key projection 56 of the cam actuator 50 in register with the keyhole aperture 65 of the corresponding gate 34, further advance of the contact actuator is limited by abutment of the handle 52 of the actuator against the front face of the end mounting block 24.

With the contactor actuator 50 inserted in this manner to its limit position, the contact actuator may be rotated 45° by means of the handle 52 to swing the corresponding end gate 34 to open position and thus permit the lower edge portion of a printed circuit board to be inserted into the corresponding slot 25 longitudinally of the slot. When a gate 34 at one end of the slot is opened by the actuator 50, the gate 34 at the other end of the slot remains closed to serve as a stop for correct positioning of the board. After the printed circuit board is inserted, reverse rotation of the contact actuator 50 through the angle of 45° closes the corresponding gate 34 and then the contact actuator is withdrawn completely from the socket assembly to permit the resiliently biased contacts to swing to their effective positions for cooperation with the newly inserted printed circuit board.

FIG. 7 indicates how a printed circuit board with electrical terminals 38 and 40 on its opposite faces at its upper and lower edge portions may be inserted endwise simultaneously into a lower socket assembly 76 and an upper socket assembly 78 to cooperate with both socket assemblies. One advantage of such an arrangement is that it prevents the insertion of a printed circuit board into the socket assemblies in any other manner than the correct manner of endwise insertion of the board.

FIG. 8 shows how an upper guard panel 80 spaced above a socket assembly 82 serves the same purpose of making sure that a printed circuit board 84 is inserted endwise into the socket assembly.

The second embodiment of the invention illustrated by FIGS. 9–14 is largely similar to the first embodiment but in this instance rotation of a contact actuator generally designated 85 through an angle of 45° opens a gate 34*a* in the previously described manner and simultaneously retracts all of the pairs of contacts 42 and 44 associated with the corresponding slot of the socket assembly. As shown in FIGS. 13 and 14, the shank 86 of the contact actuator 85 has a noncircular cross-sectional configuration to retract the pairs of contacts 42 and 44 by cam action in response to rotation of the shank through an angle of 45°.

The contact actuator 85 has a handle 88 equipped with a radial arm 90 and adjacent the handle 88, the chank 86 is reduced to a neck 91 of circular cross section. A passage 92 of the socket body of the assembly to receive the actuator 85 is of circular cross section, the circular cross section being of a diameter to permit the noncircular shank 86 to rotate through the range of 45°.

The entrance to the passage 92 is a noncircular aperture 94 in an end mounting block 24*a* which aperture, as shown in FIG. 11, is of the same noncircular configuration as the shank 86. Adjacent the noncircular aperture 94, the passage 92 is continued by a similar noncircular aperture 95 in the cylindrical base portion 66*a* of a corresponding gate 24*a*. It can be seen in FIG. 12 that the noncircular aperture 95 of the gate conforms closely to the noncircular cross-sectional configuration of the shank 86.

When the actuator is fully inserted from either end of the socket assembly through the noncircular aperture 95 of one gate 34*a* the inner end of the actuator falls short of the noncircular aperture of the second gate. Thus, as in the first embodiment of the invention, the actuator opens only the one gate that is at the end of the socket body that receives the actuator, the closed gate serving as a stop for a board.

When the contact actuator 85 is progressively inserted into the passage 86 of the socket assembly, the fixed noncircular aperture 94 at the entrance to the passage keeps the actuator from being rotated on its axis out of the position shown in FIG. 13. The actuator is freely movable longitudinally in the pssage 92 because it is not in pressure contact with the plastic sleeves 48 of the various conductors 46.

When the handle 85 abuts the front face of the end mounting block 24*a* to stop the advance of the contact actuator, the neck portion 91 of the actuator registers with the fixed noncircular aperture 94 of the end mounting block 24*a* to free the actuator for rotation on its axis. When the noncircular shank 86 of the actuator is rotated 45° from the position shown in FIG. 13 to the position shown in FIG. 14, it retracts the pairs of contacts by cam action as shown and at the same time the noncircular shank 86 rotates the gate 24*a* 45° from its closed position to its open position. To return the pairs of contacts 42 and 44 to their normal effective positions shown in FIG. 13 it is merely necessary to reverse the rotation of the actuator 45° thereby not only returning the pairs of contacts to their normal effective positions but also returning the corresponding gate 34*a* to its normal closed position. The contact actuator 85 may then be withdrawn for subsequent use.

FIG. 15 shows how a contact actuator 98 may be substituted for the actuator 85 to open both of the gates instead of just one gate, the advantage being that a printed circuit board may be inserted from either end of the socket assembly. To assure correct positioning of a printed circuit board, the distance between the two gates is substantially equal to the length of the board. Thus, an incorrectly positioned board blocks closing of one or the other of the two gates and thereby prevents withdrawal of the actuator.

The actuator 98 is identical to the actuator 85 but is longer by the thickness of one gate 34*a*. FIG. 15 shows how the inner end of the actuator 98 extends into the noncircular aperture 95 of the second gate 34*a* but falls short of the noncircular aperture 94 in the second end mounting block 24*a*.

FIG. 16 shows how an actuator 100 similar to the actuator 98 with a shank of the same noncircular configuration may be permanently journaled in a passage 92 of a socket assembly to control the contacts associated with a corresponding slot of the assembly. One end of the actuator 100 is formed with a screw driver slot 102 and a radial flange 104 that abuts the corresponding end mounting block 24*a*. The other end of the actuator 100 also has a screwdriver slot 102. A washer 105 abuts the second end mounting block 24*a* and is retained by a snap ring 106. The actuator 100 may be rotated from either end by a screwdriver and opens both of the gates simultaneously as well as retracting the corresponding contacts 42 and 44.

My description in specific detail of the selected embodiments of the invention will suggest various changes, substitutions and other departures from my disclosure within the spirit and scope of the appended claims.

I claim:

1. In a low insertion force electrical socket to receive an edge portion of a printed circuit board having at least one electrical terminal thereon, the combination of:

a socket assembly having a socket in the form of a slot with one end of the slot open to provide an entrance to permit the edge portion of the printed circuit board to be inserted into the slot longitudinally of the slot;

gate means having a normally closed position blocking entrance to the slot to prevent the insertion of a printed circuit board, said gate means being movable to an open position;

contact means included in the socket assembly adjacent the slot, said contact means normally extending to the slot for cooperation with said terminal or terminals on the printed circuit board, said contact means being retractable from the slot; and actuation means insertable into the slot in cooperative relationship with the contact means and the gate means and operable to retract the contact means from the slot, the actuation means being cooperative with the gate means and the contact means to prevent opening of the gate means unless the contact means becomes retracted.

2. A combination as set forth in claim 1 in which said contact means is biased to its normally closed position and the actuation means retracts the contact means in opposition to such bias.

3. A combination as set forth in claim 1 in which the actuation means becomes disposed in cooperative relationship with the contact means and the gate means only upon insertion of the actuating means to a limit position in the socket assembly;

and in which the actuation means includes normally disabled means to open the gate means when enabled;

and in which the gate means includes means to enable said normally disabled means in response to insertion of the actuation means to said limit position.

4. A combination as set forth in claim 1 in which operation of said actuation means includes insertion of the actuation means to a limit position in the socket assembly;

and which includes means operably connecting the actuation means to the gate means in response to insertion of the actuation means to said limit position thereby to make the gate means operable by rotation of the actuation means.

5. A combination as set forth in claim 1 in which said actuation means becomes operative upon insertion of the actuation means to a limit position in the socket assembly;

and in which the gate means is responsive, upon insertion of the actuation means to the limit position, to open in response to rotation of the actuation means when the actuation means is inserted to said limit position.

6. A combination as set forth in claim 1 which includes means to prevent insertion of the edge portion of a printed circuit board into the slot of the socket assembly in any manner except endwise of the slot.

7. A combination as set forth in claim 1 which includes detent means to yieldingly hold the gate means in its closed position.

8. In a low insertion force electrical socket to receive an edge portion of a printed circuit board having at least one electrical terminal thereon, the combination of:

a socket assembly having a socket in the form of a slot with an entrance at one end of the slot to permit the edge portion of the printed circuit board to be inserted into the slot longitudinally of the slot;

normally closed gate means blocking the entrance to the slot to prevent the insertion thereinto of a printed circuit board;

contact means included in the socket assembly adjacent the slot, said contact means normally extending to the slot for cooperation with said terminal or terminals on the printed circuit board, said contact means being retractable from the slot;

and actuation means normally separate from the socket assembly and insertable into the socket assembly to retract the contact means and to open the normally closed gate means.

9. A combination as set forth in claim 8 in which said gate means is responsive to the actuating means to open in response to rotation of the actuating means on its longitudinal axis when the actuating means is completely inserted into the socket assembly.

10. A combination as set forth in claim 8 in which said contact means is responsive to the actuating means to retract in response to insertion of the actuating means into the socket assembly.

11. A combination as set forth in claim 10 which includes cam means unitary with said actuating means to retract the contact means in response to longitudinal movement of the actuating means into the socket assembly.

12. A combination as set forth in claim 11 in which the leading end of the actuating means is tapered to retract the actuating means in response to insertion of the actuating means.

13. A combination as set forth in claim 12 in which said contact means includes two rows of contacts and in which the leading end of the actuating means is tapered to retract the two rows of contacts by wedging action between the two rows.

14. A combination as set forth in claim 8 in which cam means unitary with the actuation means is operable to retract the contact means in response to rotation of the actuating means but only when the actuating means is completely inserted into the socket assembly.

15. A combination as set forth in claim 8 in which said slot has two entrances respectively at its two opposite ends;

which includes two normally closed gate means at the two entrances respectively;

in which the actuation means is insertable into the opposite ends selectively of the socket assembly to retract the contact means;

and in which the actuation means controls that one of of the two gate means which corresponds to that end of the socket assembly into which the actuation means is inserted.

16. A combination as set forth in claim 8, in which the socket assembly has a plurality of slots to cooperate with a corresponding plurality of printed circuit boards;

in which the socket assembly has a corresponding plurality of contact means respectively associated with the slots respectively;

in which the socket assembly has a corresponding plurality of gate means respectively associated with the slots respectively;

in which the socket assembly has a corresponding plurality of passages respectively adjacent the slots respectively to receive said actuation means selectively to retract the corresponding contact means and to open the corresponding gate means.

17. A combination as set forth in claim 16, in which each of said slots has two entrances respectively at its opposite ends, which includes two gate means at the opposite entrances respectively of each slot;

in which the actuation means is insertible selectively into the opposite ends of each of the passages, and in which the actuation means controls that one of the two gates of each slot which corresponds to the end of the corresponding passage into which the actuation means is inserted.

18. A conbination as set forth in claim 1 in which the actuation means is movable in a first respect to retract the contact means and is movable in a second respect to open the gate means;

and which includes means to prevent movement of the actuation means in the second respect until completion of its movement in the first respect.

19. A combination as set forth in claim 8 which includes stop means to limit the insertion of the board at the correct position to register contact means in the socket assembly with the terminals on the board.

20. A combination as set forth in claim 19 which includes two gate means at oppostie opposite respectively of the slot;

in which the actuation means is insertable into the opposite ends of the socket assembly selectively;

and in which the actuation means opens the gate means corresponding to the end of the socket assembly into which the actuation means is inserted, the other gate means remaining closed to serve as said stop means for the board.

21. In a low insertion force electrical socket to receive an edge portion of a printed circuit board having at least one electrical terminal thereon, the combination of:

a socket assembly having a socket in the form of a slot that is open at its opposite ends to provide opposite entrances to receive the edge portion of the board;

two normally closed gate means at the two entrances respectively of the slot blocking the two entrances;

contact means adjacent the slot and normally extending into the slot to cooperate with the terminal on the board, said contact means being retractable from the slot;

actuation means movable into the socket past an adjacent one of the gate means to a limit position and disposed in cooperative relationship with the adjacent one of the gate means and the contact means in the limit position and operable in the limit position to insure the retraction of the contact means and to open at least the adjacent one of the gate means.

22. A combination as set forth in claim 21 in which the actuation means retracts the contact means and substantially simultaneously opens the adjacent one of the two gate means in the limit position of the actuation means.

23. A combination as set forth in claim 21 in which the length of the board is substantially equal to the distance between the two gate means to cause the board to block closing of one of the gate means if the board is not positioned centrally of the two gate means.

24. In a low insertion force electrical socket to receive an edge portion of a printed circuit board having at least one electrical terminal thereon, the combination of:

a socket assembly having a socket in the form of a slot that is open at its opposite ends to provide opposite entrances to receive the edge portion of the board;

two normally closed gate means at the two entrances respectively of the slot blocking the two entrances;

contact means adjacent the slot normally extending into the slot to cooperate with the terminal or terminals on the board, said contact means being retractable from the slot;

actuation means operable to retract the contact means and to open both of the gates, the actuation means retracting the contact means during insertion of the actuation means to the limit position and opens the adjacent one of the two gate means in the limit position.

25. In a low insertion force electrical socket to receive an edge portion of a printed circuit board having at least one electrical terminal thereon, the combination of:

a socket assembly having a socket in the form of a slot with one end of the slot open to provide an entrance to permit the edge portion of the printed circuit board to be inserted into the slot longitudinally of the slot;

gate means having a normally closed position blocking entrance to the slot to prevent the insertion of a printed circuit board, said gate means being movable to an open position;

contact means included in the socket assembly adjacent the slot, said contact means normally extending to the slot for cooperation with said terminal or terminals on the printed circuit board, said contact means being retractable from the slot;

actuation means operable to retract the contact means from the slot; and means to prevent opening of the gate means unless the contact means is retracted, the actuation means is movable in a first respect into the slot in the socket assembly and is movable in a second respect, after the completion of the movement in the first respect, to retract the contact means and open the gate means.

26. In a low insertion force electrical socket to receive an edge portion of a printed circuit board having at least one electrical terminal thereon, the combination of:

a socket assembly having a socket in the form of a slot with one end of the slot open to provide an entrance to permit the edge portion of the printed circuit board to be inserted into the slot longitudinally of the slot;

gate means having a normally closed position blocking entrance to the slot to prevent the insertion of a printed circuit board, said gate means being movable to an open position;

contact means included in the socket assembly adjacent the slot, said contact means normally extending to the slot for cooperation with said terminal or terminals on the printed circuit board, said contact means being retractable from the slot;

actuation means operable to retract the contact means from the slot; and means to prevent opening of the gate means unless the contact means is retracted, the actuation means is movable in a first respect into the slot in the socket assembly and is movable in a second respect, after the completion of the movement in the first respect, to retract the contact means and open the gate means, the movement of the actuation means in the first respect is linear and the movement of the actuation means in the second respect is rotary.

27. In a low insertion force electrical socket to receive an edge portion of a printed circuit board having at least one electrical terminal thereon, the combination of:

a socket assembly having a socket in the form of a slot with one end of the slot open to provide an entrance to permit the edge portion of the printed circuit board to be inserted into the slot longitudinally of the slot;

gate means having a normally closed position blocking entrance to the slot to prevent the insertion of a printed circuit board, said gate means being movable to an open position;

contact means included in the socket assembly adjacent the slot, said contact means normally extending to the slot for cooperation with said terminal or terminals on the printed circuit board, said contact means being retractable from the slot;

actuation means operable to retract the contact means from the slot; and means to prevent opening of the gate means unless the contact means is retracted, the actuation means is movable in a first respect to retract the contact means and is movable in a second respect to open the gate means, the movement of the actuation means in the first respect is linear and the movement of the actuation means in the second respect is rotary.

* * * * *